US008607403B2

(12) United States Patent
Van Den Berg et al.

(10) Patent No.: US 8,607,403 B2
(45) Date of Patent: Dec. 17, 2013

(54) AUTONOMOUS MOVABLE VEHICLE HAVING A FILLABLE CONTAINER AND AN ASSEMBLY INCLUDING THE AUTONOMOUS MOVABLE VEHICLE AND A FILLING STATION

(75) Inventors: Karel Van Den Berg, Bleskensgraaf (NL); Jan Martinus Van Kuilenburg, Wadenoyen (NL); Arie Huyzer, Nieuw Lekkerland (NL)

(73) Assignee: Lely Patent N.V., Maassluis (NL)

( * ) Notice: Subject to any disclaimer, the term of this patent is extended or adjusted under 35 U.S.C. 154(b) by 251 days.

(21) Appl. No.: 13/273,782

(22) Filed: Oct. 14, 2011

(65) Prior Publication Data

US 2012/0090110 A1 Apr. 19, 2012

(30) Foreign Application Priority Data

Oct. 15, 2010 (NL) ...................................... 1038311

(51) Int. Cl.
*A47L 7/00* (2006.01)
*E01H 1/08* (2006.01)

(52) U.S. Cl.
USPC .............................................. 15/320; 15/319

(58) Field of Classification Search
USPC ............. 15/320, 322, 319, 339, 340.1; 701/1, 701/23, 36
IPC ..................... A47L 7/00; E01H 1/08

See application file for complete search history.

(56) References Cited

FOREIGN PATENT DOCUMENTS

| DE | 10 2004 060 107 | 6/2006 |
|---|---|---|
| EP | 1 369 017 | 12/2003 |
| EP | 2 183 965 | 5/2010 |
| WO | WO 00/70935 | 11/2000 |
| WO | WO 2007/067037 | 6/2007 |
| WO | WO 2010/080029 | 7/2010 |

*Primary Examiner* — David Redding
(74) *Attorney, Agent, or Firm* — Oblon, Spivak, McClelland, Maier & Neustadt, L.L.P.

(57) ABSTRACT

An autonomous movable vehicle including: a propelling device; a fluid receiving conduit having at least one fill opening through which a container can be filled; at least one fluid dispensing opening through which a fluid is dispensed; and a controller that causes the vehicle to autonomously approach a fluid delivery station that is separate from the vehicle and that causes the fill opening to couple to the fluid delivery station, wherein when the fill opening and the fluid delivery station are in an interfacing position, fluid is transferred from the fluid delivery station into the container, and the fill opening of the fluid receiving conduit is disposed at a location spaced apart from and to one side of a central mirror axis of the vehicle which axis extends in the direction of travel of the vehicle.

16 Claims, 4 Drawing Sheets

AUTONOMOUS MOVABLE VEHICLE HAVING A FILLABLE CONTAINER AND AN ASSEMBLY INCLUDING THE AUTONOMOUS MOVABLE VEHICLE AND A FILLING STATION

CROSS-REFERENCE TO RELATED APPLICATION

The present application claims priority under 34 U.S.C. §119 to Dutch patent application number 1038311, filed Oct. 15, 2010, the entire contents of which is herby incorporated by reference.

TECHNOLOGICAL FIELD

Exemplary embodiments described herein relate to an autonomous movable vehicle with a container that maybe filled through a fill opening. Exemplary embodiments described herein also relate to an assembly including the vehicle and a filling station. Exemplary embodiments described herein relate to an unmanned, autonomous movable vehicle which is adapted carry liquid in a reservoir and also has the capability to dispense the liquid.

BACKGROUND

EP1100315 and EP2183965, the entire contents of which are hereby incorporated be reference, describe vehicles that are adapted to displace manure over a stable floor and these vehicles have a container to hold the fluid which is to be dispensed while traveling the stable floor. Since no fluid mains are connected to the vehicle, the vehicle needs to go to a filling station in order to be (re-) filled.

WO 2007/067037, the entire contents of which are hereby incorporated by reference, describes a vehicle that is equipped to feed suckling animals such as calves and includes a liquid inlet opening and liquid teat-like dispensing means.

SUMMARY

A problem associated with the vehicles described in EP1100315, EP2183965, and WO 2007/067037 is that the vehicle has to present itself at filling station and couple a fill opening to the filling station.

The known autonomously movable vehicles have a central fill opening, such as described in EP2183965 where the fill opening is at the rear of the vehicle. This means that the vehicle can only couple to the fill station at the end of an aisle and only by driving rearwardly to connect. The positions in a stable where the filling station may be arranged thus are limited.

Some of the exemplary embodiments described herein may provide an autonomous vehicle which is easier to connect to a filling station.

Another problem, more particularly in relation with a manure cleaning vehicle is that the vehicle when positioning itself near the fill station inevitably will drag manure with it and thus will soil the floor under and adjacent the filling station. In case the filling station is located in a pit, manure may be shoved into the pit by the vehicle when it connects to the filling station. The farmer will have to regularly clean this area.

Some of the exemplary embodiments described herein may solve the problem of soiling the floor adjacent the filling station.

An exemplary embodiment may be an autonomous movable vehicle including a propelling device, a fluid receiving conduit having at least one fill opening through which a container can be filled and at least one fluid dispensing opening through which a fluid can be dispensed, a controller that causes the vehicle to autonomously approach a fluid delivery station that is separate from the vehicle and that causes the fill opening to couple to the fluid delivery station, wherein when the fill opening and the fluid delivery station are in an interfacing position, fluid is transferred from the fluid delivery station into the container, and the fill opening of the fluid receiving conduit is disposed at a location spaced apart from and to one side of a central mirror axis of the vehicle which axis extends in the direction of travel of the vehicle.

By locating the fill opening at a side of the vehicle, the vehicle can maneuver to filling stations at locations different from the end of an aisle, although that option (end of the aisle) is still available too. Thus, a range of possible positions of the filling station is now increased. Also, the vehicle can couple to the filling station without dragging filth with it to the location of the filling station.

Advantageously, the fluid receiving conduit of the vehicle comprises an elongated member which extends substantially parallel to the central mirror axis of the vehicle and wherein the fill opening is on a free end of the elongated member. By providing an elongated member, it is easier to connect to the filling station.

In particular, for a manure displacing vehicle, advantageously, the fluid dispensing opening is located such that fluid is dispensed onto the floor to the front of the manure slide when seen in the direction of travel of the vehicle. By locating the fluid dispensing opening such that liquid is dispensed in front of the manure slide, the fluid will soften dried manure which facilitates sliding of the manure relative to the floor. Additionally, the liquid may open clogged openings in a floor that is provided with openings for the manure to pass through.

Further, advantageously, the fluid dispensing opening is located in front of the manure slide. By positioning the fluid dispensing opening in front of the manure slide it becomes easier to ensure that the liquid is disposed in front of the slide. Also, less pressure is needed compared to the situation when a dispense opening, such as spray nozzle, is located atop the vehicle and the liquid needs to be sprayed beyond the front of the vehicle.

Further, advantageously, the propelling device of the vehicle may include a pair of independently drivable first and second propelling devices disposed at either side of the central mirror axis. By providing independently drivable propelling devices such as, e.g., wheels or caterpillar tracks, the vehicle may be maneuvered by varying the drive torque on the wheels. Such maneuvering capability helps when the vehicle is coupling itself to a filling station.

According to another exemplary embodiment, an assembly is provided that includes the vehicle and a fluid delivery station with a fluid delivery conduit. Either the fill opening of the fluid receiving conduit of the vehicle or the fluid delivery conduit includes a guiding unit that guides the fill opening and the fluid delivery conduit into the interfacing position.

The steering of the vehicle may not be completely perfect and a risk of missing the interfacing position is present. By providing a guiding unit on either the vehicle or the filling station a margin of error in maneuvering the vehicle into the proper interfacing position can be allowed. Thus, the guiding unit can assist the vehicle in its steering actions to connect the vehicle to the filling station.

Advantageously, the guiding unit may include a funnel. By providing a funnel, an enlarged area is created for the vehicle to connect to the filling station. Thus, it becomes easier to properly connect the vehicle to the filling station.

Further, advantageously, either the elongated member of the fluid receiving conduit or the fluid delivery conduit may be movable with two degrees of freedom in a plane of intersection substantially perpendicular to the central mirror axis of the vehicle, while the other one of the elongated member or the fluid delivery conduit is stationary in these degrees of freedom, such that when the vehicle is coupling the fill opening to the fluid delivery station, either the elongated member or the fluid delivery conduit is guided by the guide unit into the interfacing position without the vehicle needing to be finely steered to correct its position.

By making one of the interfacing parts movable in the above described manner, a further improvement in the ease of connecting the vehicle with the filling station may be obtained. The movability translates into a situation where once contact is made the movability allows for proper alignment into the interfacing position without further steering of the vehicle being necessary. Thus, the amount of fine steering of the vehicle in order to position itself in the interfacing position is reduced and the manoeuver can be done faster.

Advantageously, the filling station may further include a connection to a supply conduit and a valve between the supply conduit and the fluid delivery conduit, and a valve actuator adapted to move the valve between an open position in which fluid can exit the fluid delivery conduit and a closed position and the valve actuator is actuatable by the vehicle.

By making the vehicle into the actuator for the valve of the fluid delivery conduit a complete automation of the system may be possible.

Advantageously, the valve actuator may include a lever actuatable by the vehicle, and wherein the lever is biased to the valve in closed position.

By making the vehicle into a hardware actuator for the valve of the fluid delivery conduit, complicated and expensive electronic control may be dispensed with.

Advantageously, the lever may be spring biased to the closed position of the valve.

By making the lever spring biased, complicated and expensive electronic valve control may be dispensed with.

Advantageously, the valve actuator may include a four bar linkage operatively connected to the fluid delivery conduit and the linkage being movable between a first position in which the valve is closed and in a second position in which the valve is open. When the vehicle is coupling the fill opening to the fluid delivery station it pushes the linkage from the first position into the second position such that the valve is changed from closed to opened position.

Although many different structural linkages are possible, a four bar linkage provides a reliable, trouble free, structural switching mechanism for the valve and as such may be particularly useful in industrial environments such as a stable with livestock.

Further, advantageously, the filling station may be mounted at a height above the floor allowing at least a portion of the vehicle at the side of the central mirror axis opposite the side with the fill opening of the fluid receiving conduit to pass underneath the filling station.

By mounting the filling station on a wall and above the floor and thus allowing the manure sliding vehicle to pass underneath with at least a portion of the vehicle, the floor may be cleaned to remove any amount of dirt that was dragged to the station or left there by an animal. Thus, apart from preventing manure accumulating near the filling station, by providing the fluid receiving conduit at a side of the vehicle, the floor near the station may be cleaned too.

Further, advantageously, the fluid may be a cleaning fluid and includes used flushing and/or cleaning liquids that previously have been used in a robotic milking system.

By using the used flushing and/or cleaning liquids of a robotic milking system, the usage of drinking water may be reduced. Additionally, these previously used liquids may be acidic and as such may have a lowering effect on the pH of the manure in the stable and thus may have a positive effect on the ammonia NH3/ammonium NH4+ ratio. As such, by using used flushing and/or cleaning liquids of a robotic milking system, the ammonia emission by the manure may be reduced.

BRIEF DESCRIPTION OF THE DRAWINGS

Further aspects and advantages of the exemplary embodiments described herein will be apparent from the detailed description below o and the drawings thereof, in which.

DETAILED DESCRIPTION

Figure 1:
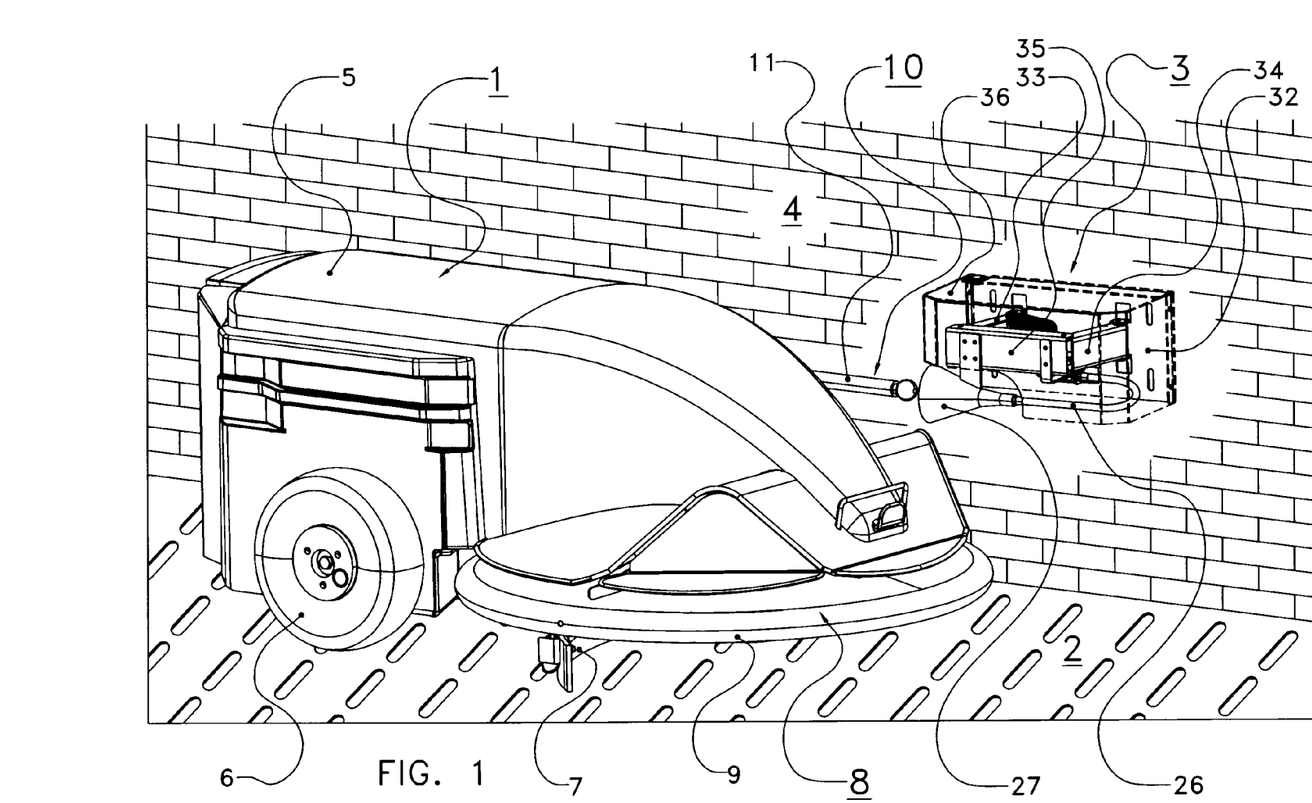
FIG. 1 is a schematic view of an exemplary autonomous movable vehicle with a fill opening positioned adjacent a filling station.
Figure 2:
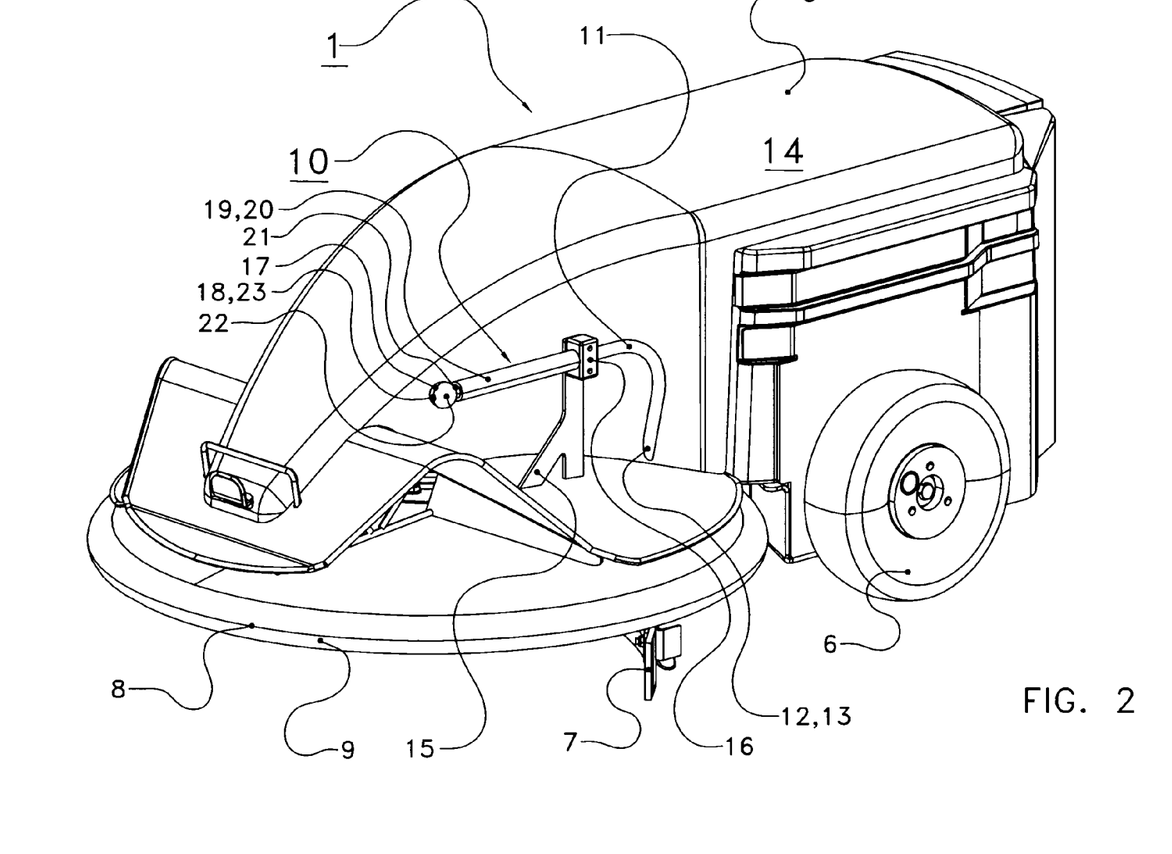
FIG. 2 is a schematic view of an exemplary autonomous movable vehicle with the fill opening.

An exemplary embodiment of the autonomous movable vehicle 1 is shown in FIG. 1 on stable floor 2 adjacent a filling station 3 that is mounted to wall 4. The vehicle as shown in the exemplary embodiment of FIGS. 1 and 2 is a vehicle for displacing manure across stable floor 2 and includes a frame 5, a pair of driven wheels 6 and a manure slide 7 connected to the frame. The vehicle further includes wall following means 8 which include a wheel 9 which is freely rotatable about a vertical axis.

The vehicle further includes a container (not shown) in which liquid can be stored, a fluid receiving means 10 by which the container can be (re-)filled with liquid. The fluid receiving means 10 of the vehicle 1 as shown in FIGS. 1 and 2 includes a fluid conduit 11 which may be in the form of a hose or a pipe. The conduit 11 starts at a fixed point 12 where it is connected to an opening 13 in the cover 14 of the vehicle at which location the conduit penetrates to the interior and into the fluid container (not shown). The conduit 11 is supported to the vehicle by support 15 and hose clamp 16. As can be seen in FIG. 1, the support 15 ensures that the conduit 11, and in particular the free end 17 with a fluid inlet or fill opening 18, is located at a height above the level of the wheels 6 and of the wall following means 8. An elongated member or length 19 of the conduit 11 extends beyond hose clamp 16 and is stiff enough to remain in a general horizontal position. In order to achieve the desired stiffness, the length of the hose is surrounded by a coil spring 20. At the free end 17 of the conduit 11, a hose socket 21 connects the length 19 to a sealing means having the form of a rubber ball 22. The ball 22 includes a central fluid passage 23 coaxial with that of the conduit 11.

The elongated member or length 19 of the conduit 11 is movable in two degrees of freedom in a plane of intersection that is substantially perpendicular to a central mirror plane of the vehicle when seen in the direction of travel. This freedom of movement is realized by intermediate fixed point in the conduit created by the hose clamp 16, by which the elongated member or length 19 can move relative to this point. The range of movement is largest at the free end 17 of the length 19 of the conduit 11 where ball 22 is attached.

As best seen in FIG. 1, fluid delivery or supply station 3 is mounted on wall 4. The height at which the fluid supply station 3 is mounted is chosen so that the fluid receiving means 10 of the vehicle can be put in an interfacing position with the fluid delivery station 3. These dimensions are chosen such that the vehicle body with at least the drive wheels 6, the manure slide 7 and the wall following means 8 are below the fluid delivery station 3.

Figure 3:
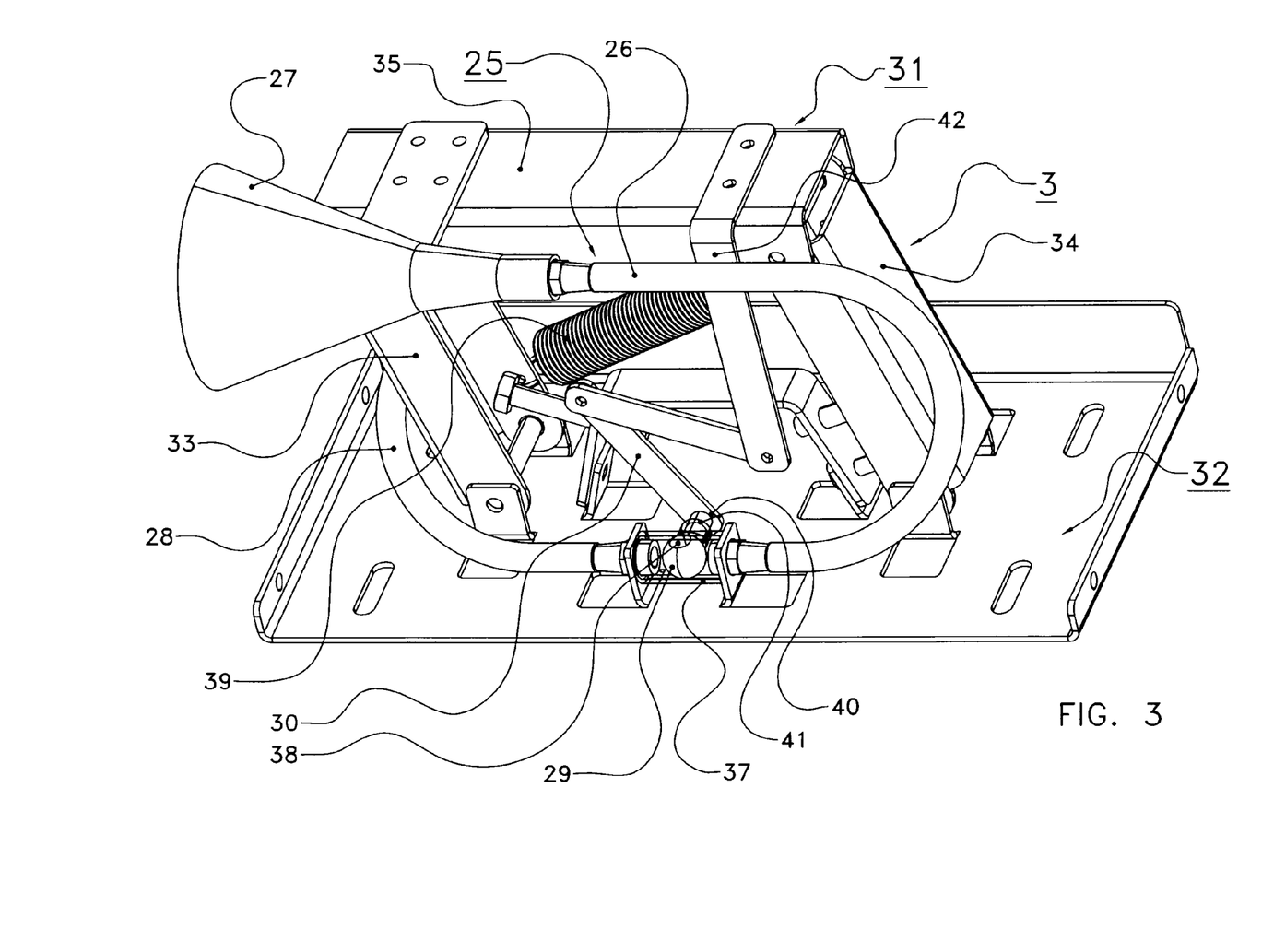
FIG. 3 is a schematic view of an exemplary filling station including the valve actuator.

As best seen in FIG. 3, the filling station 3 includes a fluid delivery means 25 in the form of a delivery hose or delivery conduit 26 ending in a guiding means in the form of funnel 27. The station also includes a supply conduit 28 and a valve 29 between the supply and the delivery conduit 26, 28 respectively. Valve 29 is actuated by lever 30 which in turn is connected to a four bar linkage system 31. The four bar linkage 31 includes a base 32 of a fixed link, a pair of left and right upstanding parallel links 33, 34 projecting perpendicular from the base and a top link 35 connecting the left and right links. The fluid delivery conduit 26, and in particular the funnel 27, is connected to top link 35 of the four bar linkage 31. The base 32 of the linkage 31 is mounted to the wall 4 and a cover 36 surrounds the filling station 3. The cover is provided with a cut-out portion for the funnel 27 which remains accessible to the fluid receiving means of the vehicle. The four bar linkage 31 is in the form of a parallelogram linkage which has two distinct positions, a first and second position. These positions, one of which is illustrated in FIGS. 1 and 3, are a first position in which the valve 29 is closed and a second position in which the valve is open. As is best visible in FIG. 3, the ball valve 29 mounted in a tubular housing 37 is in closed position because the through bore 38 of the valve is not aligned with the respective fluid delivery and supply conduits 26, 28. A tension spring 39 is mounted diagonally between the left and right upstanding links 33, 34 such that the four bar linkage 31 is biassed in the position where the valve is in a closed position. The valve actuating lever 30 is connected with one end 40 to valve handle 41 and with another end 42 to top link 35. The funnel 27 is also connected to top link 35.

The supply conduit 28 of the fluid delivery station may be connected to water mains (not shown) and/or directly or indirectly to a storage container for used cleaning and/or flushing liquid stemming from a milking robot. Used cleaning and/or flushing liquids stemming from a milking robot may be acidic and as such may have a lowering effect on the pH of the manure in the stable and thus on the ammonia NH3/ammonium NH4+ ratio. As such, by using used flushing and/or cleaning liquids that were previously used by a robotic milking system, the ammonia emission by the manure may be reduced. Alternatively, an additional line may be added to the fluid supply station 3 in order to add chemical or other types of additives to the fluid for the vehicle that enhance cleaning properties of the fluid and/or that have a lowering effect on the pH of the manure in the stable and thus on the ammonia emission.

The vehicle may also be provided with a spray nozzle (not visible) through which liquid can be dispensed. By spraying a liquid, such as water based solution, on the floor, manure is easier to displace. The nozzle or nozzles are ideally located on the vehicle such that liquid can be sprayed onto the floor in front of the manure slide 7. In a preferred embodiment, the nozzle(s) are located underneath the vehicle, in front of the manure slide with the fluid dispensing opening directed to the floor.

The vehicle 1 may also provided with a control unit (FIG. 4) and a torque determining device (not shown) for determining the torques acting on the wheels 6 as well as the torque difference between the wheels. Such a torque determining means is known per se. Determining torque difference may be used for detecting skid of one of the wheels, after which detection it is possible to perform a correct action (reduction of the number of revolutions, alarming an operator) or for actively steering a vehicle to drive in a particular direction, make a turn, reverse or the like.

Figure 4:
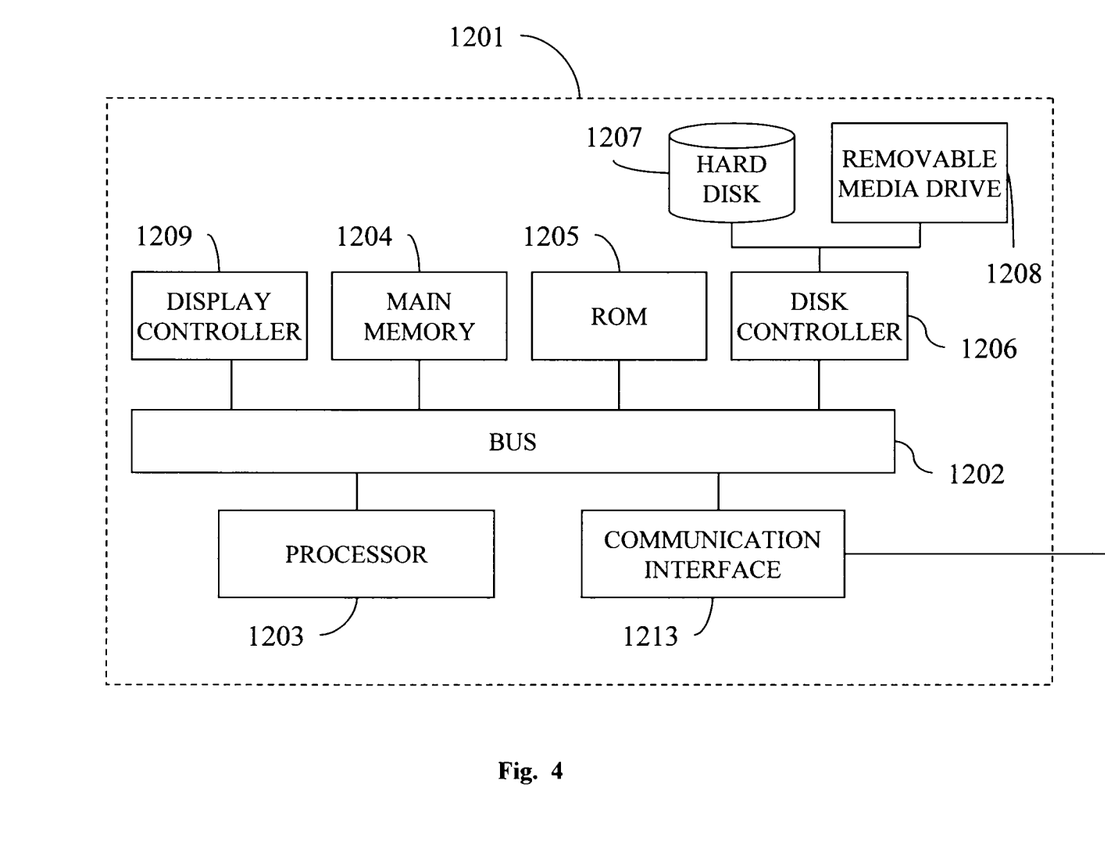
FIG. 4 shows an exemplary control unit.

FIG. 4 illustrates a control unit 1201. The control unit 1201 includes a bus 1202 or other communication mechanism for communicating information, and a processor 1203 coupled with the bus 1202 for processing the information. The control unit 1201 also includes a main memory 1204, such as a random access memory (RAM) or other dynamic storage device (e.g., dynamic RAM (DRAM), static RAM (SRAM), and synchronous DRAM (SDRAM)), coupled to the bus 1202 for storing information and instructions to be executed by processor 1203. In addition, the main memory 1204 may be used for storing temporary variables or other intermediate information during the execution of instructions by the processor 1203. The control unit 1201 further includes a read only memory (ROM) 1205 or other static storage device (e.g., programmable ROM (PROM), erasable PROM (EPROM), and electrically erasable PROM (EEPROM)) coupled to the bus 1202 for storing static information and instructions for the processor 1203.

The control unit 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the control unit 1201 using an appropriate device interface (e.g., small computer system interface (SCSI), integrated device electronics (IDE), enhanced-IDE (E-IDE), direct memory access (DMA), or ultra-DMA).

The control unit 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The control unit 1201 may also include a display controller 1209 coupled to the bus 1202 to control a display 1210, such as a cathode ray tube (CRT), for displaying information to a computer user. The computer system includes input devices, such as a keyboard 1211 and a pointing device 1212, for interacting with a computer user and providing information to the processor 1203. The pointing device 1212, for example, may be a mouse, a trackball, or a pointing stick for communicating direction information and command selections to the processor 1203 and for controlling cursor movement on the display 1210. In addition, a printer may provide printed listings of data stored and/or generated by the control unit 1201.

The control unit 1201 performs a portion or all of the processing steps of the invention in response to the processor 1203 executing one or more sequences of one or more instructions contained in a memory, such as the main memory 1204. Such instructions may be read into the main memory 1204 from another computer readable medium, such as a hard disk 1207 or a removable media drive 1208. One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the control unit 1201 includes at least one computer readable medium or memory for holding instructions programmed according to the teachings of the invention and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes, a carrier wave (described below), or any other medium from which a computer can read.

Stored on any one or on a combination of computer readable media, the present invention includes software for controlling the control unit 1201, for driving a device or devices for implementing the invention, and for enabling the control unit 1201 to interact with a human user (e.g., print production personnel). Such software may include, but is not limited to, device drivers, operating systems, development tools, and applications software. Such computer readable media further includes the computer program product of the present invention for performing all or a portion (if processing is distributed) of the processing performed in implementing the invention.

The control unit controls the unmanned vehicle 1 to move in certain directions of travel. When the vehicle touches an obstacle, such as a cow's leg, with the wall following means 8, this results in a resultant force on the vehicle, which causes the vehicle to run around the obstacle. The wall following means 8 may also be used for following a wall. In that case the vehicle is constantly caused by the controller to run in a direction towards the wall. Subsequently there is exerted by the wall a reactive force on the wall following means in the direction away from the wall. As a result thereof the vehicle runs in a straight line along the wall, while the wall following means 8 remain in contact with the wall.

The vehicle's navigation is further enhanced by programming the route the vehicle is to follow into the control unit. The route includes so-called bumping points. A bumping point is a point at which the vehicle drives into a fixed structure (such as e.g. a wall, a filling station or the like) and is unable to continue moving, which is detected by monitoring the wheel speed. The control unit will command the vehicle to execute a certain action at each programmed and detected bumping point. The action can be, e.g., turn right, turn left, reverse, hold until the container is filled, hold until the battery is recharged, etc.

In use, the vehicle travels a stable floor and displaces manure as it proceeds through the stable. The floor of such stables are generally so-called open floors and the manure falls through grooves or openings in the floor into a manure cellar. It is also possible to have so-called closed stable floors where the manure is pushed into the manure pit at the end of a stable aisle.

The control unit may be programmed to spray liquid onto the floor of the stable. The desired number of predetermined times per day for the vehicle to use liquid to clean the floor in addition to sliding the manure, can be chosen by the user.

A sensor will indicate when the container is empty or almost empty and the vehicle will be directed by the control unit to go to the fluid delivery station. The location of this station 3 is programmed into the control unit as a bumping point when the vehicle is first used in a particular stable. The vehicle is programmed to exert a certain predetermined force when connecting to the station 3. This force is high enough to overcome the spring force of the tension spring 39. The pushing force of the vehicle against the fluid delivery station can be regulated by the amount of current/power provided to the electric motors driving the wheels. More current/power results in more torque on the wheels, which translates to kgs or lbs of pushing force. An optimum pushing force is determined for the fluid delivery station. When the desired pushing force is reached, the vehicle stops pushing and is held in position by the wheel resisting rotation when they are not driven. The vehicle is thus not pushed away by the spring force of tension spring 39 of the fluid delivery station. Other brakes are possible, but preferably braking and holding the vehicle in place is inherent to the way the wheels are connected to the electric motors. Rotating the wheels by themselves, i.e. when they are not being driven, is resisted by the motor.

In use, when the vehicle approaches the filling station 3, the sealing means, i.e. rubber ball 22 of the fluid receiving means 10 of the vehicle 1 will first enter into contact with the guiding means, i.e. the walls of the funnel 27. Since the length 19 of the fluid receiving conduit 11 is movable, the rubber ball 22 will follow the walls of the funnel 27 even if the length 19 and the funnel 27 were not perfectly aligned. The length 19 of the fluid receiving conduit 11 will deflect from its original position in order to allow the rubber ball 22 to follow the walls of the funnel 27. At the narrow end of the funnel 27, the ball will deform and create a fluid tight seal. The forward movement of the vehicle continues but the ball 22 cannot move any further, thus the forward movement of the vehicle is transmitted to the funnel 27. Since the funnel 27 is connected to top link 35, the movement is transmitted to the four bar linkage. The force of the forward movement of the vehicle at the location of the filling station is programmed to be enough to overcome the tension spring force of spring 39. Thus, the linkage is pushed from its first position to the second position. Since lever 30 of valve 29 is connected to the top link when the four bar linkage switches position, this also acts on the lever 30. The lever 30 is attached to the valve 29 such that the movement from the first to the second position moves the valve from a closed to an open position. Thus, the valve 30 opens and fluid is allowed to stream from the supply conduit 28 through valve 30 into the delivery conduit 26, into the fluid receiving conduit 11 and into the container of the vehicle only after the sealing means are in the position that a fluid tight seal is formed. When the container is full, the control system receives a signal that the container is full from a sensor and directs the vehicle to reverse out of contact with the fluid delivery station 3. By this movement, the tension spring 39 pulls the linkage back into the first position and the lever closes the valve. Further backward movement of the vehicle causes ball 22 to be pulled out of contact with the funnel walls and out of contact with the funnel. The vehicle may be programmed to drive a few meters back and make a small turn to subsequently drive in a forward direction around the fill station. In the routing of the vehicle, it may be programmed that the vehicle at certain times will be directed to drive to the fluid delivery station 3 approaching it from the opposite direction as the direction which it can connect to it. By passing the station from this direction, the fluid receiving means are at the side of the vehicle removed from the wall. The vehicle can pass and while passing the manure slide 7 cleans the floor area underneath the station 3.

It is thus believed that the assembly and construction of the present invention is apparent from the forgoing description. The invention is not limited to the single embodiment herein described and, with the purview of the skilled person; modifications are possible which should be considered within the scope of the appended claims.

In this regard, although the described embodiment of the vehicle only shows a vehicle for pushing manure the invention is not limited to such a vehicle. In particular the proposed fill means and filling station may also be used for other vehicles that have a container and that dispense liquid. For example a vehicle including liquid feed or colostrums for nursing suckling animals such as calves also falls within the scope of the invention.

Further, regarding the elongate member 19 of the conduit which is proposed as a length 19 of hose stiffened with a surrounding coil spring, this may be replaced by any other type of conduit that has the proposed stiffness but which may also deflect in the proposed degrees of freedom. For example, a stiff tube that is supported by a hinged connection to the vehicle is possible, in that it would allow the desired movements of the fill opening relative to the funnel of the spout. Other types of stiffening means in place of the coil spring 20 such as, e.g., an elongated stiffening member connected lengthwise to the conduit in stead of surrounding the conduit may also be used.

Regarding the guiding means 27, although in the described embodiment the filling station is provided with a funnel and the length 14 of the conduit can deflect to be guided into the funnel, alternatively it is possible to program the control unit and add sensors so that the vehicle can follow a guiding surface on or adjacent to the filling station 3 and actively steer the vehicle into the proper interfacing position for filling the container.

The sealing means have been describe as being a rubber ball 22, but may be of different shape and/or material such as, e.g., conical or annular, as long as the sealing properties are such that in the interfacing position a fluid tight seal is effectuated.

Although in the described embodiment the valve 29 of the fluid supply station 3 is a ball valve, other quarter turn valves such as butterfly valves or plug valves may also be used in the four bar linkage valve actuator.

Manure is used in the specification to indicate animal excrements also known as feces, dung or the like.

The invention claimed is:

1. An autonomous movable vehicle comprising:
   a propelling device;
   a fluid receiving conduit having at least one fill opening through which a container can be filled;
   at least one fluid dispensing opening through which a fluid is dispensed; and
   a controller that causes the vehicle to autonomously approach a fluid delivery station that is separate from the vehicle and that causes the fill opening to couple to the fluid delivery station,
   wherein when the fill opening and the fluid delivery station are in an interfacing position, fluid is transferred from the fluid delivery station into the container, and
   the fill opening of the fluid receiving conduit is disposed at a location spaced apart from and to one side of a central mirror axis of the vehicle which axis extends in the direction of travel of the vehicle.

2. The vehicle of claim 1, wherein the fluid receiving conduit comprises an elongated member which extends substantially parallel to the central mirror axis of the vehicle and the at least one fill opening is on a free end of said elongated member.

3. The vehicle of claim 1, wherein the vehicle is a cleaning vehicle and further comprises:
   a manure slide disposed such that the vehicle can displace manure over a floor of a stable, wherein the fluid dispensing opening is disposed to dispense the fluid onto the floor and to a front of the manure slide when seen in the direction of travel of the vehicle.

4. The vehicle of claim 3, wherein the fluid dispensing opening is disposed in front of the manure slide.

5. The vehicle of claim 1, wherein the propelling device includes a pair of independently drivable first and second propelling devices disposed at either side of the central mirror axis.

6. An assembly comprising:
   the vehicle of claim 1; and
   the fluid delivery station, which comprises a fluid delivery conduit,
   wherein either the fill opening of the fluid receiving conduit of the vehicle or the fluid delivery conduit comprises means for guiding the fill opening and the fluid delivery conduit into the interfacing position.

7. The assembly of claim 6, wherein said means for guiding comprises a funnel.

8. The assembly of claim 6, wherein
   the fluid receiving conduit comprises an elongated member which extends substantially parallel to the central mirror axis of the vehicle and the at least one fill opening is on a free end of said elongated member, and
   either the elongated member of the fluid receiving conduit or the fluid delivery conduit is movable with two degrees of freedom in a plane of intersection substantially perpendicular to the central mirror axis of the vehicle, while the other one of the elongated member or the fluid delivery conduit is stationary in these degrees of freedom, such that when the vehicle is coupling the fill opening to the fluid delivery station, either the elongated member or the fluid delivery conduit is guided by said means for guiding into the interfacing position.

9. The assembly of claim 6, wherein the filling station further comprises a connection to a supply conduit and a valve between the supply conduit and the fluid delivery conduit, and a valve actuator that moves the valve between an open position in which fluid can exit the fluid delivery conduit and a closed position, and the valve actuator is actuatable by the vehicle.

10. The assembly of claim 9, wherein the valve actuator comprises a lever actuatable by the vehicle and said lever is biased to the valve in the closed position.

11. The assembly of claim 10, wherein the lever is spring biased to the closed position of the valve.

12. The assembly of claim 9, wherein the valve actuator comprises a four bar linkage operatively connected to the fluid delivery conduit and the linkage being movable between a first position in which the valve is closed and a second position in which the valve is open, and when the vehicle is coupling the fill opening to the fluid delivery station, the vehicle pushes the linkage from the first position into the second position such that the valve is changed from closed to opened position.

13. The assembly of claim 6, wherein the fluid delivery station is mounted at a height above a floor allowing at least a portion of the vehicle at a side of the central mirror axis opposite the side with the fill opening of the fluid receiving conduit to pass underneath the fluid delivery station.

14. The assembly of claim 13, wherein said portion of the vehicle that is able to pass underneath the fluid delivery station includes at least an independently drivable propelling device located at that side of the vehicle.

15. The assembly of claim 6, wherein the fluid is a cleaning fluid and comprises used flushing and/or cleaning liquids that previously have been used in a robotic milking system.

16. An autonomous movable vehicle comprising:
a propelling device;
means for receiving a fluid through which a container can be filled;
means for dispensing the fluid;
a controller that causes the vehicle to autonomously approach a fluid delivery station that is separate from the vehicle and that causes the fill opening to couple to the fluid delivery station,
wherein when the fill opening and the fluid delivery station are in an interfacing position, fluid is transferred from the fluid delivery station into the container, and
the fill opening of the fluid receiving conduit is disposed at a location spaced apart from and to one side of a central mirror axis of the vehicle which axis extends in the direction of travel of the vehicle.

\* \* \* \* \*